UNITED STATES PATENT OFFICE.

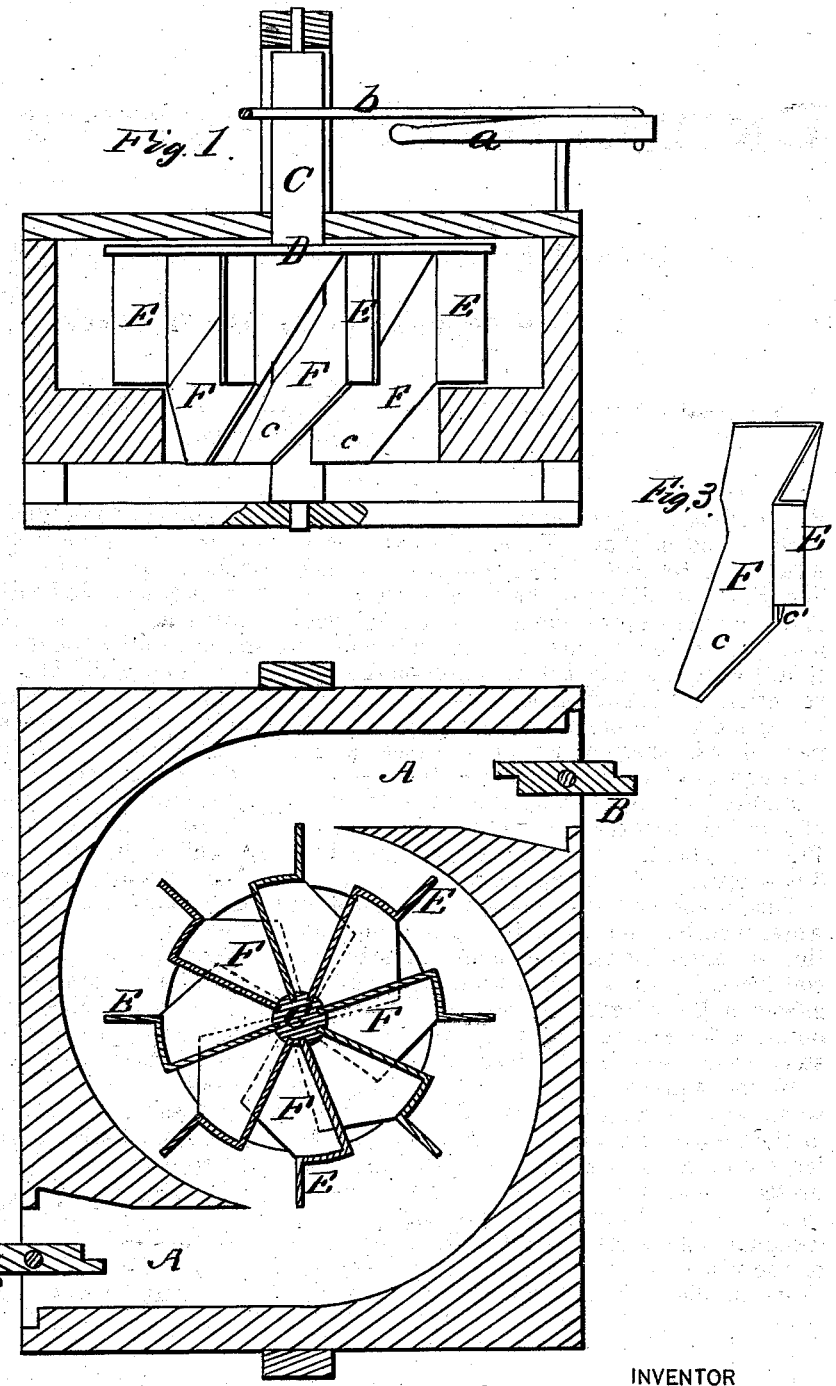

ELLIOTT E. DEWSENBERRY, OF BRONSON, MICHIGAN.

IMPROVEMENT IN WATER-WHEELS.

Specification forming part of Letters Patent No. 155,714, dated October 6, 1874; application filed September 12, 1874.

*To all whom it may concern:*

Be it known that I, ELLIOTT E. DEWSENBERRY, of Bronson, in the county of Branch and State of Michigan, have invented a new and valuable Improvement in Water-Wheels; and I do hereby declare that the following is a full, clear, and exact description of the construction and operation of the same, reference being had to the annexed drawings making a part of this specification, and to the letters and figures of reference marked thereon.

Figure 1 of the drawing is a representation of a vertical sectional view of my water-wheel. Fig. 2 is a horizontal sectional view, and Fig. 3 is a detail view, of the same.

This invention has relation to horizontal water-wheels; and it consists in the combination of radial blades and inclined buckets so constructed and arranged that the combined effects of the weight and impact of water are obtained to turn the wheel, as will be understood from the following description.

In the annexed drawings, A A designate water-ways leading to the wheel, and provided at their entrances with gates B B for regulating the influx of water. The gates are connected together by means of arms $a$ $a$ and a rod, $b$, so that they both move together. C designates the wheel-shaft, and D the top plate of the wheel, to which blades E and buckets F are applied. The blades E are arranged vertically and in radial lines around the wheel, and they are equidistant from each other. The buckets are inside of the blades, and each bucket is provided with a blade and constructed with an inclined bottom, $c$, and an outer triangular wall, $c'$, on the edge of which latter the blade is formed. The lower ends of the bucket-floors $c$, below the blades, are tapered as shown in Fig. 3, for the purpose of allowing a free discharge of water after it has expended its force, and the upper portions of the floors $c$ are closely secured to the shaft C and top plate D.

Water entering the ways A A strikes squarely against the blades E, acting upon them by direct impact, after which the water enters the buckets and acts by its weight to turn the wheel.

What I claim as new, and desire to secure by Letters Patent, is—

In a water-wheel, the radial blades E, in combination with the inclined floors $c$ and walls $c'$, forming buckets, substantially as described.

In testimony that I claim the above I have hereunto subscribed my name in the presence of two witnesses.

ELLIOTT E. DEWSENBERRY.

Witnesses:
M. MORRILL,
MILO CLARK.